United States Patent [19]
Yamamoto et al.

[11] Patent Number: 5,226,132
[45] Date of Patent: Jul. 6, 1993

[54] MULTIPLE VIRTUAL ADDRESSING USING/COMPARING TRANSLATION PAIRS OF ADDRESSES COMPRISING A SPACE ADDRESS AND AN ORIGIN ADDRESS (STO) WHILE USING SPACE REGISTERS AS STORAGE DEVICES FOR A DATA PROCESSING SYSTEM

[75] Inventors: Michitaka Yamamoto; Toshinori Kuwabara; Yoshio Oshima; Yasutaka Yamada, all of Hadano, Japan

[73] Assignees: Hitachi, Ltd.; Hitachi Computer Engineering Co., Ltd., both of Tokyo, Japan

[21] Appl. No.: 413,444

[22] Filed: Sep. 27, 1989

[30] Foreign Application Priority Data

Sep. 30, 1988 [JP] Japan .................. 63-244398

[51] Int. Cl.⁵ .............................................. G06F 12/10
[52] U.S. Cl. .................................. 395/400; 395/425; 395/375; 364/955.1; 364/255.5
[58] Field of Search ... 364/200 MS File, 900 MS File; 395/425, 400

[56] References Cited

U.S. PATENT DOCUMENTS

| | | | |
|---|---|---|---|
| 3,781,808 | 12/1973 | Ahearn et al. | 364/200 |
| 3,825,904 | 7/1974 | Burk et al. | 364/200 |
| 4,355,355 | 10/1982 | Butwell et al. | 364/200 |
| 4,521,846 | 6/1985 | Scalzi et al. | 364/200 |
| 4,604,688 | 8/1986 | Tone | 395/400 |
| 4,979,098 | 12/1990 | Baum et al. | 364/200 |
| 4,992,936 | 2/1991 | Katada et al. | 364/200 |
| 5,008,811 | 4/1991 | Scalzi et al. | 364/200 |
| 5,023,777 | 6/1991 | Sawamoto | 364/200 |

FOREIGN PATENT DOCUMENTS

3633227A1  9/1986  Fed. Rep. of Germany .

Primary Examiner—Joseph L. Dixon
Assistant Examiner—Frank J. Asta
Attorney, Agent, or Firm—Fay, Sharpe, Beall, Fagan, Minnich & McKee

[57] ABSTRACT

Instead of translation from a space address to a segment table origin address (STO) by an ordinary instruction, translation to the STO is done by a space base register modify instruction which uses an instruction to modify the content of the space register, and the result thereof is used for the operand address calculation of the instruction to the operand data fetching. The present system eliminates the need for additionally providing for hardware of an operand fetch unit hardware for the translation from the space address to the STO, memory for storing translation pairs of the space addresses and the STO's and the table look-up of the translation pairs. Thus, degradation of performance is minimized with less hardware.

5 Claims, 2 Drawing Sheets

MULTIPLE VIRTUAL ADDRESSING USING/COMPARING TRANSLATION PAIRS OF ADDRESSES COMPRISING A SPACE ADDRESS AND AN ORIGIN ADDRESS (STO) WHILE USING SPACE REGISTERS AS STORAGE DEVICES FOR A DATA PROCESSING SYSTEM

BACKGROUND OF THE INVENTION

The present invention relates to a data processing system in which a program under execution may parallelly access operands in a plurality of spaces, and more particularly to a data processing system which stores in a hardware a portion of an origin addresses of a translation table used for a translation from a logical address to a real address so that a processing time to determine the base address based on the space address is shortened.

In a prior art data processing system which uses virtual addressing in the multiple virtual storage space, a range in which an instruction can designate a logical address by using a general purpose register is called a virtual address space, and one real address is imparted by the system from one virtual address space and a logical address. The process to determine the real address from the virtual address space and the logical address is called an address translation. The address translation is carried out for each virtual address space by using an address translation table (segment table and page table) defined by the system.

The address translation table is located on a main storage and an origin address (STO: segment table origin address) is given for each virtual address space. The address translation from the logical address to the real address is carried out by looking up the translation table by using the origin address STO.

Further, in order to determine one address space from the multiple virtual address space, a space address may be designated by a base space register which corresponds to a base register used in an operand logical address calculation of the instruction, and the space address may be determined by means such as look-up of the table provided by the system.

Such prior art technique for the data processing system is disclosed in U.S. Pat. No. 4,521,846.

The above prior art technique attains a relatively small scale multiple virtual storage space having up to eight virtual storage spaces which can be parallelly accessed by the program. The prior art system includes eight STO registers and the origin addresses in the STO registers can be correlated to space base registers which are paired with the general purpose registers. In the prior art system, an ordinary instruction uses the general purpose register in calculating the address and reads the STO correlated to the space base register from the STO register to realize the multiple space address. The prior art system requires a configuration which allows a maximum number of STO's permitted by the program in the architecture to be stored into the registers or memory.

In a more advanced prior art system, when the base space register is used for the memory access, a translation pair of the space address previously stored in hardware and the STO is used.

The prior art method is explained by using an L instruction as an example of a common memory access instruction. The L instruction has a format (called an RX format) shown by 13 in FIG. 1. The L instruction may also be executed in the first preferred embodiment of the invention illustrated in FIG. 1. One of 16 general purpose registers 11 is selected as an index register by four bits of the index register number field (X2), and one of the general purpose registers 11 is selected as a base register by four bits of the base register number field (B2).

The content of the selected index register, the content of the selected base register and the content of the displacement field are summed and the sum is used as the logical address of the L instruction to designate the address in the virtual space.

On the other hand, the base register number field (B2) of the L instruction selects one of 16 space registers which are paired with the 16 general purpose registers. One virtual space address is designated by the content of the selected space register.

In this manner, the virtual space address and the logical address designated by the fields X2, B2 and D2 of the L instruction are correlated to one area on the main storage by the system, and 32-bit data is written into one of the 16 general purpose registers designated by the four bits of the R1 field of the L instruction from the area on the main storage. Thus, the processing of the L instruction is completed.

A process to determine the real address on the main storage from the virtual space address and the logical address designated during the execution of the L instruction is now explained.

The space address is used to refer to the memory which stores therein the translation pairs of the space addresses and the STO's, read out the STO corresponding to the space address of the operand, translate the logical address of the operand to the real address based on the STO and access to the buffer storage and the main storage. If a desired pair of the space address and the STO is not stored in the translation pair memory of the space addresses and the STO's, the space address translation table on the main storage is accessed by the hardware to determine the STO. Thereafter, the buffer storage and the main storage are accessed.

In the prior art system described above, a process to determine the STO from the new space address (which is called a space address translation) is required during the process from the operand address calculation of the instruction to the operand data fetching. If an architecture permits the accessing by one or more programs to a number of virtual spaces, the STO registers or the STO translation pair memory must be large scale hardware, which leads to the increase of the overall hardware which performs the instruction operand address calculation to the operand data fetching (hereinafter referred to as an operand fetch unit). As a result, the performance of the data processing system is lowered.

SUMMARY OF THE INVENTION

It is an object of the present invention to solve the problems encountered in the prior art system and provide a data processing system which simplifies a hardware configuration for the base register designation of the instruction to the determination of the STO, reduces the increase in the hardware of the operand fetch unit, and reduces the degradation of the performance due to the permission of the multiple space access.

In the prior art system, an instruction to modify the content of the space register (hereinafter referred to as an SGRM instruction) is prepared, and the access to more virtual spaces is permitted by changing the content of the space register.

A format of the SGRM instruction is shown in FIG. 1. In the SGRM instruction, general purpose registers are designated by $X_2$ and $B_2$ and the contents of the two designated general purpose registers and the content of the $D_2$ field are summed. The sum is used as the logical address of the operand, which designates the data 3 on the main storage. The data 3 designated as the operand is written into the space register designated by $R_1$. Thus, the processing of the instruction is completed.

The space address which designates the new space is set in the space register by the SGRM instruction. When the space register modified by the SGRM instruction is used by a subsequent instruction to designate the operand address, the accessing is made by the new space address.

Accordingly, when the accessing is to be made to other virtual space by using the space register, the setting to the space register is carried out prior to the actual accessing.

Accordingly, in accordance with the present invention, in order to solve the problem of degradation of the performance, instead of translating the space address to the STO by using the ordinary instruction, it is previously translated to the STO by the space base register modify instruction which uses the SGRM instruction, and the result is used for the process from the operand address calculation of the instruction to the operand data fetching.

Accordingly, in accordance with the present invention, complex hardware for the translation from the space address to the STO, the memory for storing the translation pairs of the space addresses and the STO's and the retrieval of the translation pairs need not be added to the hardware of the operand fetch unit. Accordingly, the degradation of the performance is reduced with less hardware.

In accordance with the present invention, the space address translation is performed not by the operand fetching of the ordinary instruction but by the execution of the specific space base address modify instruction. For example, for the SGRM instruction, the space address read for each operand is translated to the space address after the operand fetching of the SGRM instruction, and the result is stored in the operand fetch unit and used for the operand fetching of the ordinary instruction.

On the other hand, in the prior art system, the execution of the SGRM instruction is completed when the space address read from the memory is loaded to the space base register as it is. In the present invention, since the space address translation or the look-up of the translation pairs of the space addresses and the STO's is added, the execution performance for the SGRM instruction is lowered.

However, since the frequency of occurrence of the SGRM instruction in the program is lower than the ordinary instruction, the performance in the present invention is improved over that of the prior art system is that the number of times of the space address translation is the same in the present invention and the prior art so long as the structure and the size of the translation pairs of the space addresses and the STO's are the same.

DESCRIPTION OF THE PREFERRED EMBODIMENTS

One embodiment of the data processing system of the present invention is now explained with reference to the drawings.

Figure 1:
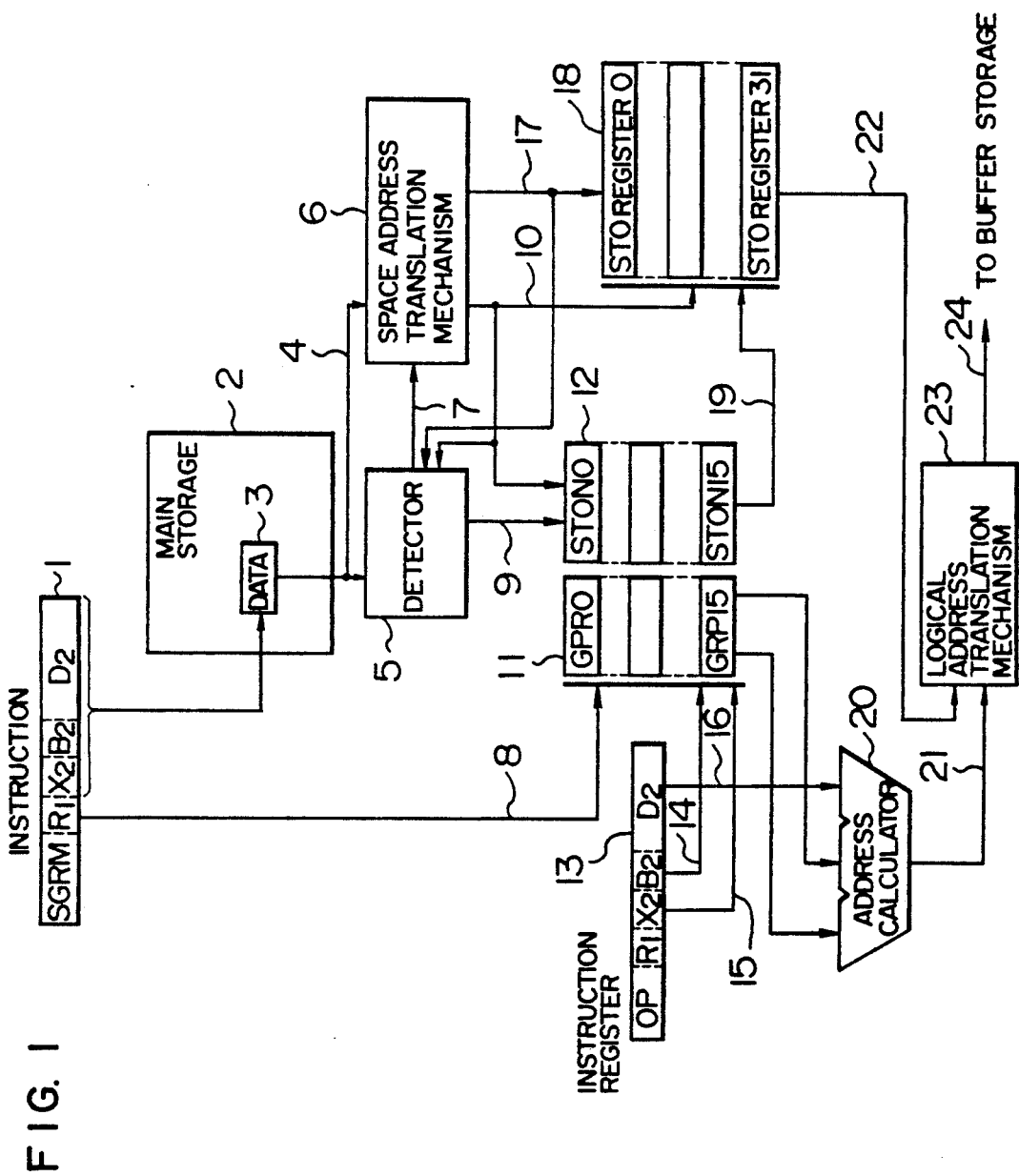
FIG. 1 is a block diagram of an embodiment of the present invention.

FIG. 1 shows a block diagram of the embodiment of the present invention. It includes portions necessary for the execution of the SGRM instruction and the determination of the real address in the operand data fetching of the ordinary instruction. In FIG. 1, numeral 2 denotes a main storage, numeral 5 denotes a detector, numeral 6 denotes a space address translation mechanism, numeral 11 denotes general purpose registers (GPR), numeral 12 denotes space registers (STON), numeral 18 denotes origin address registers (STO), numeral 20 denotes an address calculator, and numeral 23 denotes a logical address translation mechanism.

The SGRM instruction which is a non-privilege instruction is set in the register 1 and has an instruction format as shown. One area 3 in the main storage 2 is designated by second operand designation fields $X_2$, $B_2$ and $D_2$ to fetch the second operand data. The fetched second operand data is used as one virtual space address, and it is sent to the detector 5 through a signal line 4. On the other hand, the origin addresses STO of the logical address translation of the virtual space are stored in each of 32 STO registers 18. The virtual space addresses and the program ID's corresponding to the 32 STO are held in the detector 5. The detector 5 is thus provided with the means for storing the space addresses and the STO's after the translation.

The virtual space address supplied to the detector 5, which is the second operand data of the SGRM instruction is compared by the detector 5 with the 32 virtual space address held in the detector 5, and if there is a matching virtual space address therein, the detector 5 produces the corresponding STO register number in the STO registers 18 to a signal line 9. The STO register number sent to the signal line 9 is supplied to the STON registers 12 which comprise 16 STON registers and it is written into one of the 16 STON registers designated by four bits of the $R_1$ field of the SGRM instruction sent over the signal line 8.

The virtual space address supplied to the detector 5 is compared with the 32 virtual space address held in the detector 5 in the above-mentioned process, and if there is no matching virtual address therein, the detector 5 activates the space address translation mechanism 6 through the signal line 7 to translate the space address to the STO. The space address translation mechanism 6 sends the STO to the STO registers 18 which comprise 32 STO registers through the signal line 17, and also selects one STO register in which the new STO is to be registered, from the STO registers 18 and sends the STO register number to the STO registers 18 through the signal line 10 and registers the translated STO in the STO register corresponding to the selected registration STO register number.

The registration STO register number sent to the signal line 10 is also supplied to the detector 5, which registers the virtual space address which is the second operand data of the SGRM instruction at the virtual space address in the detector 5 corresponding to the STO register having the registration STO register number. The registration STO register number on the signal line 10 is also supplied to the STON registers 12 and it is registered in the STON register having the number designated by the $R_1$ field of the SGRM instruction supplied through the signal line 8.

The execution of the SGRM instruction is thus completed. In the present embodiment, it is possible to change the virtual space addresses corresponding to the 16 general purpose registers 11 which are used as the base registers, by executing the SGRM instruction. Thus, the multiple virtual addressing is attained.

The accessing of the multiple virtual space by using the base field ($B_2$) of the ordinary instruction is now explained.

The ordinary instruction is set in the instruction register 13. In the present embodiment, it is assumed that an RX type instruction, for example an L instruction is set in the instruction register and an address is calculated to fetch an operand.

The contents of the $B_2$ field and the $X_2$ field of the instruction in the instruction register 13 are supplied to the general purpose registers 11 through the signal lines 14 and 15 and one general purpose register is selected for each of the fields. The contents of the registers selected by the respective fields and the content of the $D_2$ field of the instruction supplied through the signal line 16 are supplied to the address calculator 20, which calculates an execution logic address which is an address in the virtual space and sends the execution logic address to the logical address translation mechanism 23 through the signal line 21.

On the other hand, the STO register number held in one of the STON registers 12 corresponding to the general purpose register selected by the $B_2$ field of the instruction is read and the STO register number is sent to the STO registers 18 through the signal line 19. One of the STO registers 18 is selected and the STO is read from the selected STO register and it is supplied to the logical address translation mechanism 23 through the signal line 22.

The logical address translation mechanism 23 generates a real address based on the input execution logical address and the STO and supplies the real address to the signal line 24. The real address is sent to the buffer storage and the main storage (not shown) through the signal line 24 for use in the operand fetching.

As described above, the operand of the ordinary instruction can be exactly fetched from the virtual space of the space address in the space register corresponding to the number of the base register.

Figure 2:
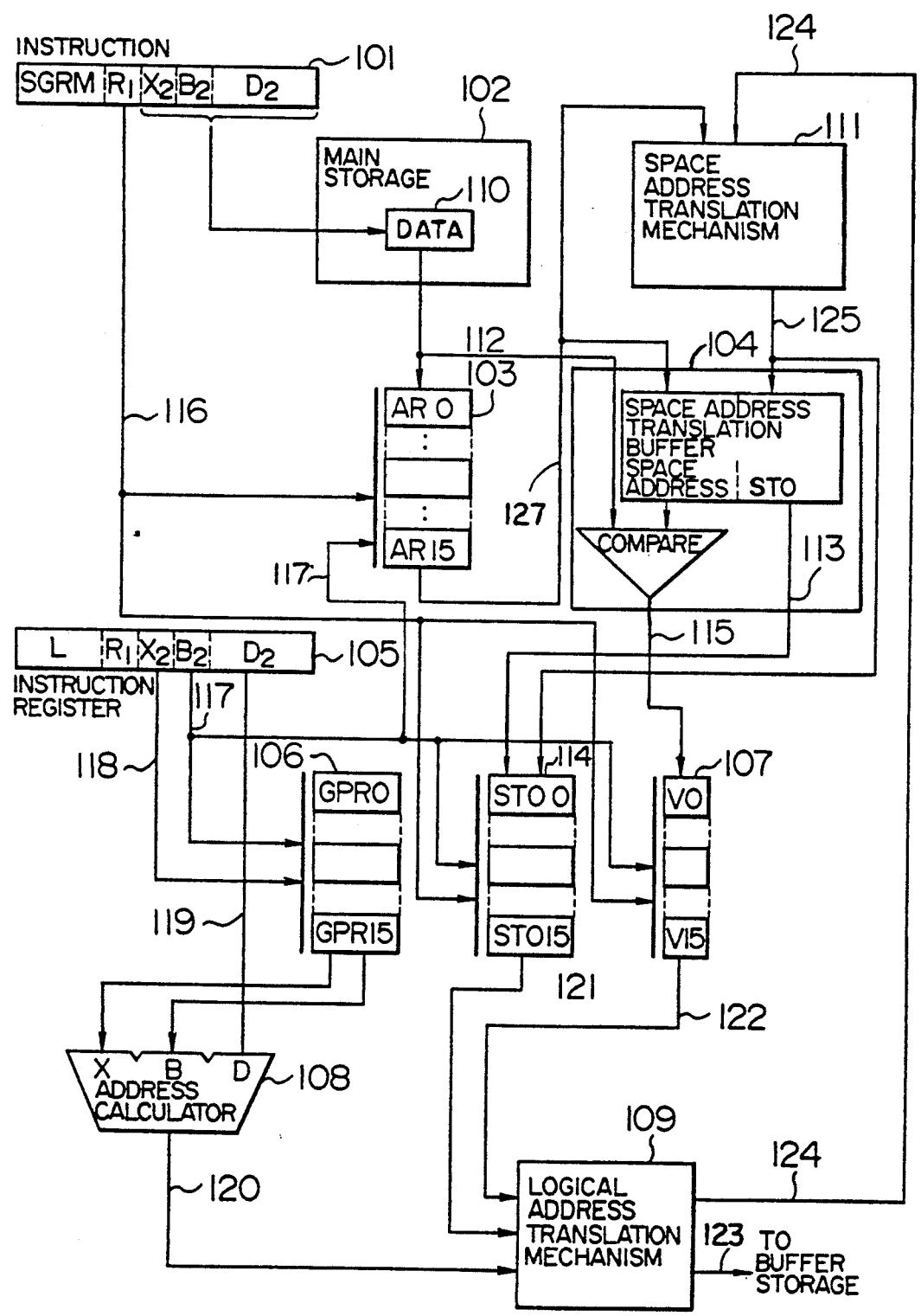
FIG. 2 is a block diagram of another embodiment of the present invention.

FIG. 2 shows a block diagram of another embodiment.

In the embodiment, in order to speed up the translation from the virtual space address to the origin address (STO) for the logical address translation of the virtual space, the space address translation buffer 104 is provided to store the pair of the virtual space address and the origin address (STO) after the space address translation.

When the SGRM instruction is executed, the space address translation buffer is looked up by the space address, and if there is a desired translation pair, the STO is written into the STO register designated by the $R_1$ field of the SGRM instruction. If there is no desired translation pair, the STO effective flag 107 corresponding to the STO register is invalidated, and if that STO register is used by the designation of the space address of a succeeding instruction operand, the space address translation mechanism 111 is activated and the desired STO is determined by looking up the space address translation table on the main storage.

In FIG. 2, a numeral 102 denotes a main storage, numeral 103 denotes space registers, numeral 104 denotes a space address buffer, numeral 106 denotes general purpose registers, numeral 114 denotes origin address (STO) registers, numeral 107 denotes origin address effective flags, numeral 108 denotes an address calculator, and numeral 109 denotes a logical address translation mechanism.

The SGRM instruction designates one area 110 in the main storage 102 by the second operand fields $X_2$, $B_2$ and $D_2$ to fetch the second operand in the first embodiment. The fetched second operand data is used as one virtual space address, and it is written into the space register 103 designated by the $R_1$ field of the SGRM instruction through the signal line 112. The second operand data is also sent to the space address translation buffer 104.

On the other hand, as described above, the space address translation buffer 104 is provided with means for storing the pairs of the virtual space addresses and the translated STO's and means for comparing a given virtual space address with the stored virtual space addresses to determine if it is stored in the buffer, and if it is stored, reading out the translated STO from the given virtual space address.

The virtual space address supplied to the space address translation buffer 104, which is the second operand data of the SGRM instruction, is compared with the virtual space addresses stored in the space address translation buffer 104, and if there is a matching virtual space address therein, the space address translation buffer sends the translated STO to the signal line 113, and sets the effective flag of the STO to "1" and sends it to the signal line 115.

The STO sent to the signal line 113 is supplied to the STO registers 114 which comprise 16 STO registers, and it is written into one of the 16 STO registers 114 designated by the $R_1$ field of the SGRM instruction supplied through the signal line 116. The effective flag of the STO sent to the signal line 115 is supplied to the 16 STO effective flags and one . of the 16 STO effective flags designated by the $R_1$ field of the SGRM instruction supplied through the signal line 116 is set to "1". Thus, the execution of the SGRM instruction is completed.

In the above process, the virtual space address supplied to the space address translation buffer 104 is compared with the virtual space addresses in the buffer, and if there is no matching virtual address therein, the space address translation buffer 104 sets the effective flag of the STO to "0" and it is sent to the signal line 115.

The effective flag of the STO sent to the signal line 115 is supplied to the 16 STO effective flags, and one of the 16 effective flags designated by the $R_1$ field of the SGRM instruction supplied through the signal line 116 is set to "0". Thus, the execution of the SGRM instruction is completed.

In the present embodiment, if the STO corresponding to the virtual space address which is the second operand data of the SGRM instruction has been stored in the space address translation buffer, the necessary STO is held in the STO register designated by the $R_1$ field of the SGRM instruction, and if that STO register is designated in the operand fetching of the succeeding instruction, the STO is directly determined based on the base field ($B_2$) of the instruction without the space address translation so that the access to the desired virtual space is attained.

On the other hand, if the STO corresponding to the virtual space address which is the second operand data of the SGRM instruction has not been store in the space address translation buffer, there is no desired STO in the STO register designated by the $R_1$ field of the SGRM instruction. When that STO register is designated by the base field ($B_2$) of the instruction when the operand of the succeeding instruction is fetched, the STO is determined by the space address translation by referencing the space address translation table on the main storage so that the access to the desired virtual space is attained.

The multiple virtual space accessing by the succeeding instruction after the execution of the SGRM instruction is now explained.

In general, the instruction is set in the instruction register 105. In the present embodiment, the RX type instruction, for example the L instruction is used for the explanation purpose.

The L instruction is fetched from the main storage and set into the instruction register 105. The contents of the $B_2$ field and the $X_2$ field of the L instruction in the instruction register 105 is supplied to the general purpose registers through the signal lines 117 and 118, and one general purpose register is selected for each field. The contents of the registers selected by the respective fields and the content of the $D_2$ field of the instruction are supplied to the address calculator 108 which calculates a logical address which is an address in the virtual space and sends it to the logical address translation mechanism 109 through the signal line 120.

On the other hand, one of the STO registers and one of the STO effective flags corresponding to the general purpose register are selected by the $B_2$ field of the instruction, and they are sent to the logical address translation mechanism 109 through the signal lines 121 and 122.

When the STO effective flag supplied through the signal line 122 is "1", the logical address translation mechanism 109 generates a real address based on the STO supplied through the signal lines 121 and 120 and the logical address, and sends the real address to the signal line 123. The real address is sent to the buffer storage and the main storage (not shown) through the signal line 123 for use in the operand fetching.

When the STO effective flag supplied to the logical address translation mechanism 109 is "0", the activation signal for the space address translation is sent to the space address translation mechanism 111 through the signal line 124.

When the space address translation mechanism receives the activation signal for the space address translation through the signal line 124, the instruction register 105 sends the $B_2$ field of the instruction through the signal line 117 to the general purpose registers 106, the origin address (STO) registers 114, the origin address effective flags 107 and to the space registers 103. The selected space register is sent to the space address translation mechanism 111 through the signal line 127 as shown in FIG. 2.

The $B_2$ field of the L instruction indicates the space register number used by the L instruction, which is the number of the space register that requires the space address by the activation signal for the space address translation.

The space address translation mechanism 111 sends the space register number supplied through the signal line 117 to the space registers through the signal line 126.

The signal line 117 selects one space register by the space register number supplied through the signal line 126 and sends it to the space address translation mechanism through the signal line 127.

The space address translation mechanism receives the space address to be translated through the signal line 127 and carries out the space address translation by referring to the space address translation table on the main storage (not shown), and sends the result to the signal line 125.

The space address translation buffer 104 receives the STO determined by the space address translation and the corresponding space address through the signal lines 125 and 127, and stores the translation pair in the space address translation buffer.

The STO determined by the space address translation supplied through the signal line 125 and the space register number supplied through the signal line 126 are supplied to the STO registers, and the STO determined by the space address translation is written into the STO register selected by the space register number.

The STO effective flag corresponding to the STO register selected by the space register number is set of "1".

Thereafter, the process is resumed by the fetching of the L instruction, and a similar process as that described above is carried out after the L instruction has been set in the instruction register.

During this process, the STO effective flag supplied to the logical address translation mechanism through the signal line 122 is "1" so that the space address translation is not started again by the second logical address translation and the corresponding real address is determined by the logical address translation.

In the embodiments herein explained, when the operand of the ordinary instruction is fetched, the STO can be directly determined based on the base register number of the instruction. Therefore, the hardware is simplified and the fetch time of the operand data is shortened.

The detection of the translation pair in the detector in the first embodiment and in the space address translation buffer in the second embodiment is effected by the comparison of only the space addresses. In actual, however, there may be a desire to hold the translation pair after the program has been dispatched. In the present invention, a program number for identifying the program such as an origin address of the space address translation table may be stored as a portion of the translation pairs for use in the comparison of the translation pairs.

In the second embodiment, when the space base register is to be modified, the new STO is registered by referring to the translation pairs of the space addresses and the STO's. In actual, there is another case where the STO corresponding to the space base register is re-registered when an instruction to erase the translation pair, a reset operation or an interrupt operation is to be executed.

In the first embodiment, the detector is provided with means for storing the space addresses for the STO's, that is, the pairs of the space addresses and the translated STO's. Alternatively, those pairs may be held in an auxiliary storage in the instruction processor.

In this case, a register for registering one of the pairs of the space addresses and the STO's, a register for registering the base register number which designates the translation pair, and a flag for indicating whether the contents of the registers are valid or not are additionally provided. When the content of the space register is to be updated, the translation pairs of the space addresses are stored in the auxiliary storage and the base register number and the translation pair of the space address are set in those two registers. The effective flag is set to "1" and the reference to the main storage by the base register number is effected by those two registers.

We claim:

1. A multiple virtual space addressing data processing system comprising:

a plurality of general purpose registers comprising base registers selectable according to a base field of an instruction executed by said data processing system;

a plurality of space registers logically corresponding to said plurality of general purpose registers in a paired relationships, the plurality of space registers each being singularly operative to be selectable in concert with a one of said plurality of general purpose registers responsive to an access instruction executed by the data processing system;

means for selectively accessing a one of a plurality of virtual spaces using the contents of said plurality of space registers as virtual space addresses in an address calculation;

space address translation means for translating the virtual space address to an origin address, the space address translation means being disposed in said data processing system connected to said plurality of space registers;

means for performing a real address translation using the origin address of said address translation means;

a plurality of origin address registers for directly reading out an origin address corresponding to a space register and designated by the base field of the instruction;

space address translation buffer means for storing translation pairs of space addresses and origin addresses obtained after a space address translation, the space address translation buffer means being disposed in said data processing system connected to said space address translation means; and detection means responsive to execution of a predetermined specified instruction for detecting a first translation pair of the space addresses and origin addresses being stored for a first given space address, the space address translation buffer means and said space address translation means being searchable in accordance with said first given space address wherein when an instruction to modify the content of a first space register is to be executed, the pairs of the space addresses and the origin addresses are looked up by said detection means using the first given space address written in a first space register, and if said detection means detects the first translation pair of said first given space address and a first origin address, the space address translation buffer means registers the relevant first origin address in a first of said plurality of origin address registers.

2. The data processing system according to claim 1, further comprising:

an auxiliary storage means for holding the pairs of the space addresses and the origin addresses;

first register means for storing a one of the translation pairs of the space addresses and the origin addresses;

second register means for registering a base register number to designate the stored translation pair; and flag means for indicating whether the contents of said second register means are valid or not, wherein when the content of the space register is to be updated, the translation pair of the space address is registered in said auxiliary storage means, and the base register number of the translation pair is set into said second register means and the flag means is set to indicate valid contents, and the reference to the main storage by the base register number is effected by said registers.

3. The data processing system according to claim 1, further comprising:

means in said space address translation means for performing a space address translation when said detection means fails to detect a translation pair and responsive to a request by an instruction by transforming a logical address of the instruction into a real address; and, means for registering the resulting origin address to said origin address register.

4. A method of real address memory accessing for use in a multiple virtual space data processing apparatus executing instructions stored in an instruction storage unit, the apparatus having a buffer storage memory, a space address translation unit, a space address translation buffer, an instruction register, a plurality of virtual space registers, a plurality of general purpose registers, a plurality of origin address registers, a plurality of origin address effective flag registers, an address calculator and a logical address translation unit, the method comprising the steps of:

fetching the first instruction from said instruction storage unit, the first instruction including an operand comprising a first virtual space address;

storing the first virtual space address in a one of said virtual space registers;

searching said space address translation buffer for a match between said first virtual space address stored in a one of said virtual space registers and a first space and origin address translation pair stored in the translation buffer corresponding to said first virtual space address;

upon a match, writing i) the origin address of the first translation pair to a first origin address register and ii) an origin address effective flag to a first origin address effective flag register;

fetching the second instruction from said instruction storage unit;

storing said fetched second instruction in said instruction register;

selecting a first general purpose register from said plurality of general purpose registers according to an index register number field of said stored instruction;

simultaneously directly selecting, according to a base register number field of said stored instruction, i) a second general purpose register from said plurality of general purpose registers, ii) said first origin address register from said plurality of origin address registers and iii) said first origin address effective flag register from said plurality of origin address effective flag registers;

transferring a first logical address index portion from said selected first general purpose register to said address calculator;

transferring a first logical address base portion from said selected second general purpose register to said address calculator;

transferring a logical address displacement portion from a displacement field of said stored instruction to said address calculator;

combining said first logical address index portion, said first logical address base portion and said logical address displacement portion in said address calculator to form a first logical address in a first virtual space;

transferring said first logical address to said logical address translation unit;

transferring a first logical address origin pointer from said selected first origin address register to said logical address translation unit;

transferring a first origin address effective flag from said selected first origin address effective flag register to said logical address unit;

generating a real address in said logical address translation unit according to said first logical address and said first logical address origin pointer when the transferred first origin address effective flag is a first predetermined value; and, accessing said buffer storage memory using said generated real address.

5. The method according to claim 4 further comprising the steps of:

generating an activation signal at said logical address translation unit when the transferred first origin address effective flag is a second predetermined value;

receiving the activation signal at said space address translation unit and performing a space address translation to determine a second logical address origin pointer;

writing the determined second logical address origin pointer into said selected first origin address pointer; and, writing said first predetermined value into said selected first origin address effective flag register.

* * * * *